Patented Sept. 29, 1942

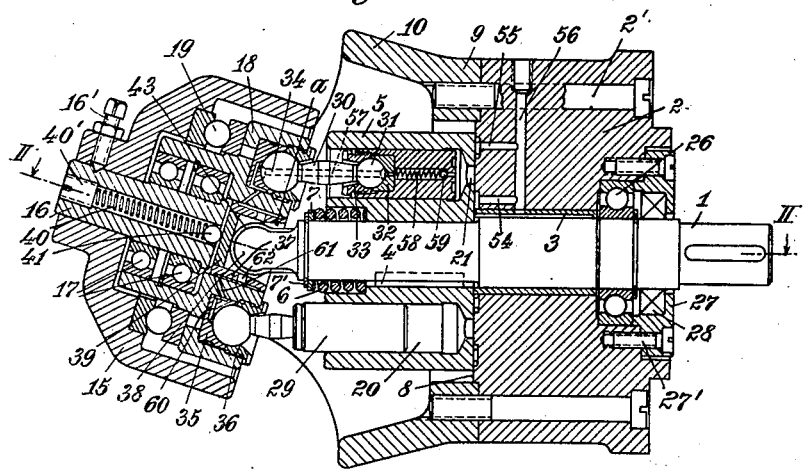

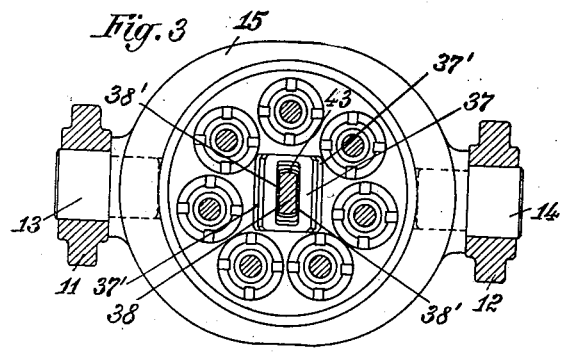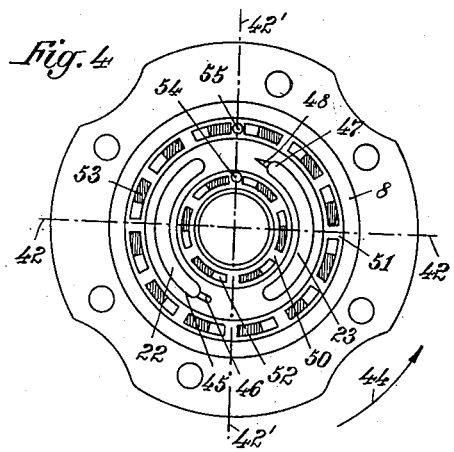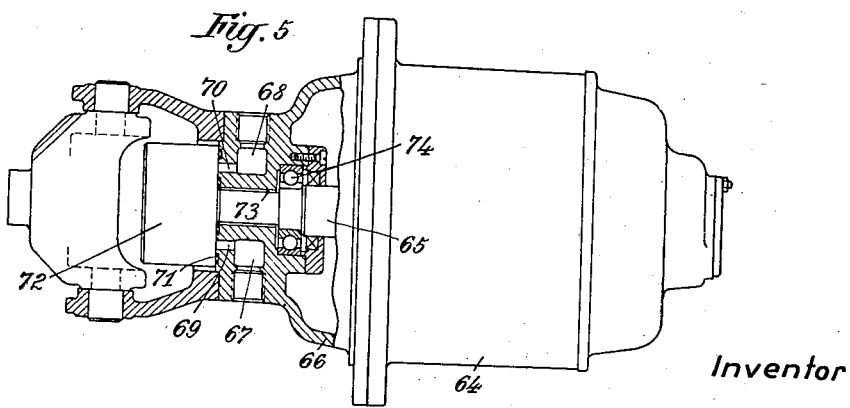

2,297,518

UNITED STATES PATENT OFFICE 2,297,518

VARIABLE SPEED HYDRAULIC POWER TRANSMISSION DEVICE

Fritz Wegerdt, Chemnitz, Germany; vested in the Alien Property Custodian

Application December 13, 1940, Serial No. 370,065
In Germany December 12, 1939

4 Claims. (Cl. 103—162)

The present invention is concerned with improvements in that type of variable speed hydraulic power transmission devices comprising generally a pair of substantially similar units, viz. a pump or driving unit and a motor or driving unit, embodying each a plurality of working cylinders arranged in a revolving casing member, a distributing member having inlet and outlet passages provided therein for the purpose of feeding the working liquid into the said cylinders and of discharging same therefrom, a plurality of pistons adapted to reciprocate in and to revolve with said cylinders, each of said pistons being connected by means of a pitman having a ball and socket joint, at both of its ends with a common revolving thrust plate member mounted to rotate within a guiding member, said thrust plate member being operatively connected to a working shaft rotating with said cylinder casing member and mounted for rotary motion within said distributing member, said cylinder casing and said thrust plate being capable of being obliquely adjusted with respect to one another, so as to obtain the necessary working of the pistons in said cylinders. It may be also possible to use one only of the said units. So for instance a pump unit of the character referred to above might be used for the purpose of supplying pressure liquid to a hydraulic drive system of any apparatus, machine tool or the like.

It has been suggested, in known devices of the above indicated type, to arrange the cylinder casing in a manner allowing for its being tilted to obtain the requisite oblique adjustment between said cylinder and a thrust plate. However such an arrangement has the great disadvantage of rendering practically impossible the provision of a sufficiently tight seal between the cylinder working spaces and the outward atmosphere, since no mounting allowing for an oblique adjustment of the cylinder casing can be practically made rigid enough, so as not to be bent under the higher pressure of the working liquid used, whereby irregularities in the distribution of the working liquid may occur.

Another disadvantage of the arrangement with a tilting cylinder casing resides in the necessity of having the working liquid passages, or at least the pressure passage, arranged in the hollow of a pivot pin carrying the tiltable support, such provision being followed by all drawbacks of such kind of structures as are known to those skilled in the art.

A further disadvantage, particularly encountered with pump units of the kind having their actuating shaft immediately connected with, or formed as an integral part of, the armature shaft of an electric motor, resides in the fact that, owing to the high R. P. M. of such units and to the high pressure of their working liquid, the individual cylinders, on their passage from a position where they communicate with the low pressure working liquid to an immediately following position where they are put in communication with the high pressure liquid, are subject to sudden shocks and vibrations, so that the operation of such units is uneven and their motion jerky.

Still a further disadvantage of the known pump and motor units of the above indicated type resides in the heretofore used operative connections between the tiltable or obliquely adjustable member and the driving or driven shaft of the respective unit. The heretofore used cardan joints or double cardan joints interconnected by a rod have been made of dimensions as small as possible in order to permit the dimensions of the entire power transmission devices to be held in moderate limits. Since, however, the forces transmitted by such cardan joints are very high, it was necessary to use particularly strong and expensive materials as well as expensive machining methods in the construction of such joints. Despite these provisions, they were constantly liable to excessive wear and/or breakage.

The present invention has for its primary object to provide an improved variable speed hydraulic power transmission device or a separate unit of such device, provided with a stationary distributing member embodying a distribution slide face to which a revolving cylinder casing member is steadily urged, so as to secure a perfectly tight seal between the cylinder working spaces and the outward atmosphere and to provide for the working liquid being adequately supplied to and discharged from the said revolving cylinders.

A further object of the invention is to provide a device or a unit of the character specified, embodying an obliquely adjustable guiding member adapted to accommodate a thrust plate member rotatably mounted in said guiding member and adapted to partake of the angular adjustment thereof, said thrust plate member having an improved simple and cheap but highly efficient movable operative connection with a working shaft adapted to rotate said cylinder casing member and said thrust plate member and being itself rotatably mounted in said stationary distributing member.

A still further object of this invention is to provide novel means by which any bending deformations, as well as injurious vibrations and shocks are eliminated, the entire unit and the power transmission device comprising such units are rendered stable and compact, simple and cheap in manufacture, as well as economical, easy and precise in operation. None of the disadvantages of the heretofore known devices of the contemplated type are present in the device hereinafter to be described.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings:

Fig. 1 is a longitudinal section of the pump unit of a hydraulic power transmission device constructed in accordance with the invention.

Fig. 2 is a section taken on the line II—II of Fig. 1.

Fig. 3 is a section taken on the line III—III of Fig. 2.

Fig. 4 is an end view of the distribution slide face.

Fig. 5 is a partial longitudinal section drawn at a reduced scale of a further embodiment of the invention having its pump unit driven by an electric motor; one of the end shields of said latter, viz. that one placed adjacent to the power transmission device, is adapted to accommodate bearing means for the pump actuating shaft and it is also provided with a distribution slide face.

Referring more particularly to Figs. 1 and 2, an actuating shaft 1 adapted to be driven by a not represented electric motor is journalled in a preferably stationary supporting body 2 by means of a bushing sleeve 3 and an antifrictional bearing 26. Rigidly carried on said shaft 1 by means of a key and groove mounting 4 is a cylinder casing 5 urged by a coiled spring 6 towards a distribution slide face 8 provided on said supporting body 2 as will be hereinafter referred to in detail. As shown on the drawings, said spring 6 is interposed in a suitably compressed state between said cylinder casing 5 and a pressure ring 7 limited in its leftward movement on the shaft 1 by any suitable means, such as a represented split ring 7' adapted to be snapped into a corresponding annular groove of said shaft 1.

A bearing member 10 provided with two bearing eyes 11, 12 and having an annular flange 9 is secured by means of bolts 2', to said supporting body 2, said bearing member being held in a centrally aligned relation to said supporting body owing to the inner periphery of its annular flange 9 being fitted so as snugly to embrace a projecting part of supporting body 2 having the said distribution slide face 8 provided thereon. Inserted into the bearing eyes 11 and 12 are pivot pins 13 and 14 secured in their position by set screws 10' and adapted tiltably to carry a guide member 15. An axial pin 16 carrying a pair of ball bearings 17 is inserted into said guide member 15 and it may be secured therein by any suitable means such as the set screw and lock nut 16'. Carried by the outer rings of the ball bearings 17 is a thrust plate 18 being also supported in said guide member 15 by a thrust ball bearing 19.

As represented on the drawings, the cylinder casing 5 is provided with seven cylindrical bores 20 arranged with their axes disposed parallel with and in a circle around the axis of the actuating shaft 1 (Fig. 3). There may be preferably arranged an uneven number of cylinder bores, such as five, seven or nine. These cylinder bores, open at one of their ends, are so arranged at their opposite end (the right-hand ends of the bores as represented on Figs. 1 and 2) that each of them passes into a connecting slot 21 arranged on the same radius as and adapted directly to communicate with a suction inlet port 22 and a pressure outlet port 23 provided in the distribution slide face 8 of the said stationary supporting body member 2.

It may be understood that such expressions as "suction" and "pressure" used in this specification and claims have to stand any time for "adapted to communicate with a space containing the working liquid at low pressure," or respectively "adapted to communicate with a space containing the working liquid at high pressure." In this connection it should be noted that in any "pump" unit the "suction" port is an inlet port, and the "pressure" port is an outlet one, whereas such conditions are directly opposite in any "motor" unit.

As may be seen on Fig. 4 both of the ports 22 and 23 are of arcuate shape. The connecting slots 21 of all the cylinders as well as both ports 22 and 23, are preferably of uniform radial dimension or breadth. The suction inlet port 22 communicates with a suction passage 24 also provided in the supporting body member 2 (Fig. 2), said suction passage being connected to any suction line not represented on the drawings. In a similar way the pressure outlet port 23 communicates with a pressure passage 25 provided in said supporting body 2 and connected to a not represented pressure line.

The antifriction bearing 26 supporting the actuating shaft 1 in body 2 is held in place in said body by means of a cover plate 27 screwed to the body 2 by means of bolts 27', a packing ring 28 being inserted into said cover plate 27, so as to prevent any leakage.

Slidably mounted in each of the cylinder bores 20 is a piston 29 universally engaged by a link or pitman 30. The universal or spherical journal 31 of each pitman is mounted in its respective piston by means of a two-part spherical socket 32, 33. Every pitman 30 is connected by the aid of a spherical journal 34 and a two-part spherical socket 35, 36 with the thrust plate member 18.

As stated above the thrust plate 18 rotatably mounted in the guide member 15 may be tilted bodily with said guide member, though being at the same time in constant operative connection with the actuating shaft 1, so as to rotate therewith. It has been found that a very efficient operative connection of the thrust plate with the actuating shaft may be provided by means of a sliding block 37 adapted to slide in a corresponding rectangular slot of said thrust plate 18. The shaft 1 is provided with a flattened end portion 38 snugly fitted in the sliding block 37. Applied in any suitable way on the flat surfaces of the end portion 38 of shaft 1 are preferably thin plates 38' (Figs. 2, 3) made of a material having a high resistance to wear. The aperture formed in the sliding block 37 for the accommodation of said flattened end portion 38 of the actuating shaft is closed by a cover 39 rigidly connected with said sliding block. A ball 41 subject to the pressure of a coiled spring 40 and slidably mounted in a bore of the axial pin 16 provides for a steady contact of the cover 39 with the outer face of the flattened end portion 38 of the actuating shaft 1, said spring 40 having its opposite end supported in the bore by a plug 40'. As represented at 43, the front and side surfaces of the flattened end portion 38 of shaft 1 and of the applied plates 38' are spherically rounded off, the centre of said spherical surface lying in the point of intersection of the axis of said actuating shaft 1 with the axis of the pivot pins 13, 14. The diameter of the spherical surface 43 is somewhat inferior to the height of the aperture formed in said sliding block 37. This height dimension may be clearly seen in Fig. 3 as well as from Fig. 1 where it is identical with the longer dimension of the section of cover 39, also represented on said figure. Owing to this there is a space allowing for a certain play between the sliding block 37 and the end portion 38 of the shaft in a plane parallel to the flat surfaces of said latter and in a direction substantially at right angles to the axis of shaft 1.

In addition thereto the block 37 may be arranged so as to be slidable in the direction of the axis of revolution of thrust plate 18 (against the pressure of spring 49), as may be seen from Figs. 1 and 2. Still a further freedom of movement is provided by the dimension of the slot in the thrust plate 18 being substantially larger in the direction of the axis of pivot pins 13, 14. On both sides of the sliding block 37 there is a free space 37', as may be seen from Figs. 2 and 3. A certain rotation between shaft 1 and sliding block 37 about the axis of the pins 13, 14 is rendered possible by the provision of bevel surfaces a (Fig. 1) and about an axis at right angles both to said latter axis and to the axis of shaft 1 by the provision of bevel surfaces b, c (Fig. 2) on said sliding block 37.

The horizontal central line 42 (Fig. 4) of the suction inlet port 22 and the pressure outlet port 23 is parallel with the oscillation axis of the tiltable guide member 15 identical as stated above with the axis of the pivot pins 13 and 14. Both of the ports 22 and 23 have an arcuate conformation and they extend in both directions from said central line 42, said ports being terminated in a certain distance before another central line 42' being at right angles to the first-mentioned central line 42. The purpose of this provision is to prevent that a slot 21 of a cylinder bore 20 could register simultaneously both with the suction inlet port 22 and with the pressure outlet port 23.

Let us suppose that the cylinder casing 5, when at work, revolves in the direction of the arrow 44 of Fig. 4, and that the guide member 15 can only be tilted in the direction represented on Fig. 1, so that the port 22 serves always as inlet port and port 23 remains constantly outlet port. The suction port 22 has at its end 45 at which the communication between the individual revolving cylinders and said suction port is cut off an extension groove 46 having such a length that the connecting slots 21 of the individual cylinders still communicate with said extension groove when the respective piston 29 has somewhat moved past its dead centre position. A corresponding extension groove 48 is provided at the end 47 of the pressure outlet port 23. The extension groove 46 has a substantially constant cross section throughout its length, whereas the cross section of the extension groove 48 decreases in the direction of the commencing suction inlet port.

The longitudinal movement of a piston in the neighbourhood of the vertical central line 42' passing between two adjacent ends of the ports 22 and 23 in the distribution slide face 8 is exceedingly small. However any cylinder, after having moved out of register with the end of suction port 22, has still to move a certain distance to the left (Figs. 1 and 2) until it reaches its dead center point, so that a depression is still liable to be created in its working space. Under these circumstances the provision of an extension groove 46 as stated above is absolutely necessary, because otherwise, in the next moment when the connecting slot 21 of the contemplated cylinder begins to come into register with the pressure outlet port 23 (bottom right hand side of Fig. 4), it may occur that the high pressure working liquid will be suddenly thrown into the partly evacuated working space of the cylinder. This would result in a shock impairing the smooth operation of the device. It has been found practical to have the extension groove 46 made of uniform cross section on its entire length. An extension groove 48 at the end 47 of the pressure outlet port 23 has the purpose of gradually interrupting the conection between the individual cylinders leaving said outlet port 23 open to high pressure working liquid and said outlet port so as to avoid a shock at this occurrence also. Therefore such groove 48 has its cross section gradually diminishing towards its end in the direction of the commencing suction inlet port as stated above.

The distribution slide face 8 formed on the supporting body member 2 is provided in a manner known per se with annular depressions 50, 51 having the distribution ports 22 and 23 arranged therebetween. An oil supply duct 56 and a pair of bores 54, 55 provided in supporting body member 2 are adapted to feed lubricating oil to said depressions 50, 51 and to the distribution slide face 8. Lugs 52, 53 are left in said annular depressions having their front faces gradually sloped in a manner known per se down to the bottom surface of said depressions, so as to assist in securing a uniform lubrication of the working surfaces, at the same time improving the seal between the distribution slide face 8 and the co-operating end surface of the cylinder casing 5.

Every pitman 30 is provided with a longitudinal bore 57 communicating with the cylinder space 20 by the way of a longitudinal bore 58 provided in every piston 29. Mounted in said longitudinal bore 58 is a spring loaded non-return valve 59 opening in the direction of the bore 57. Further on, a lubricating duct 60 is provided in every socket part 35 communicating with another duct 61 leading the lubricating oil onward by means of apertures 62 provided in opposite walls of the sliding block 37 and to the flattened end portion 38 of the actuating shaft 1. There are also ducts 63 going from the socket parts 35 so as to enable the lubricating of the ball bearings 17 and 19.

The operation of the hereunto described pump unit, which may, for instance, form a part of a variable power transmission device, is as follows: The cylinder casing 5 and the thrust plate 18 are revolved by means of the actuating shaft 1 driven by any prime mover (not represented) whereas the supporting body 2 and the bearing member 10 remain stationary. If the axis of the thrust plate 18 carried by the guide member 15 coincides with the actuating shaft axis, the pistons 29 remain stationary in their cylinder bores 20, so that the pump supplies no liquid.

Should the thrust plate 18 be tilted out of the axis of the actuating shaft 1 by a corresponding angular adjustment of the tiltable guide member 15, so as represented on Fig. 1, the pump pistons 29 perform a reciprocating movement in their respective cylinder bores 20. Be it assumed that the cylinder casing 5 and the thrust plate 18 perform a counterclockwise rotation in relation to the stationary supporting body 2, as represented by the arrow 44 of Fig. 4. Under such circumstances, every cylinder 20 of casing 5 will descend on the left hand part of the distribution slide face 8 (Fig. 4) and it will ascend on its right hand part. As may be seen from Fig. 1, a descending movement of any cylinder bore 20 results in its corresponding piston 29 being moved to the left, so as to create a depression in the respective cylinder; on the other hand, an ascending cylinder will have its piston moving to the right (in Fig. 1), i. e. the liquid will be pressed out of the working space of such cylinder. As may be seen, a pumping of the working liquid will result, the liquid being urged to flow on the following path: suction line (not represented), suction passage 24 (Fig. 2), inlet port 22 (Figs. 2, 4), slot 21 of any cylinder, respective cylinder bore 20, again slot 21, outlet port 23 (Figs. 2, 4) pressure passage 25 (Fig. 2) and pressure line (not represented).

In a motor unit, having precisely the same arrangement as the herein contemplated pump unit, the inflowing high pressure liquid will press the consecutive pistons to the left, whereas the pistons of the ascending cylinders (provided that the parts are in the mutual position represented on Fig. 1), will expulse the liquid, which has done its work, through the outlet port into a low pressure space (not represented).

The greater is the angle to which the thrust plate has been adjustably deflected, the larger is the stroke of the pumping pistons and the larger is the quantity of liquid supplied by the pump or consumed by a motor. The direction in which the liquid is supplied is reversed if the thrust plate is tilted in opposite direction past the axis of the actuating shaft. The operation is a continual one.

In the embodiment represented on Fig. 5 the reference mark 64 indicates an electric motor adapted to drive the pump unit. The armature shaft 65 of said motor is formed integrally with the actuating shaft of the pump unit. A suction passage 67 and a pressure passage 68 are provided in the bearing shield 66 of the electric motor, said passages terminating in a way similar to that described in connection with Figs. 1–4 by an inlet port 69 and an outlet port 70 respectively. Both these ports are provided in a distribution slide face 71 (identical to distribution slide face 8 of Figs. 1 to 4) towards which a cylinder body 72 is urged. The mounting of shaft 65 by means of a bushing sleeve 73 and an antifriction bearing 74 is identical with that of the hereunto described embodiment. As for the rest, the embodiment represented on Fig. 5 is identical with that of Figs. 1 to 4 so that no further description is deemed necessary.

Thus it may be seen that the present invention provides an improved type of variable speed hydraulic power transmission device or respectively a pump unit or a motor unit of the character described which are simple and cheap in manufacture, will have a stable and compact structure and will operate in an economical, easy and precise way. The particular advantages of the present invention are caused among others by the provision of a distribution slide face on a stationary supporting body having a bearing member removably connected thereto, so that it is no more necessary, as it has been with known devices of this class, to have such distribution slide face hand scraped, provided that efficient seal between such slide face and the corresponding end surface of a cylinder casing had to be secured. The just described arrangement permits for the slide face to be made on a body portion projecting out of the surrounding parts so that such distribution slide face may be easily and very precisely machined by a suitable machine tool. Moreover, such projecting arrangement of the distribution slide face provides a dead true centering for the fitting of the bearing member on said supporting body member.

Owing to the stationary arrangement of the supporting body member and to the use of the above described operative connection between the thrust plate 18 and the actuating shaft 1 by means of sliding block 37 it is no more necessary, as it has been in previous constructions of this class, to have the actuating shaft mounted in a thrust bearing in addition to its radial rotary mounting. In addition to these advantages, the described operative connection between the thrust plate and the actuating shaft represents a very simple and expedite, highly efficient structure capable of being manufactured at a low price. It consists but of a few comparatively large parts capable of being easily machined and having their stresses under service conditions remaining within moderate limits. Moreover the disclosed operative connection is well adapted to compensate for any minor inaccuracies in the fitting, which may happen to occur even in the most precise production systems. The provision of separate hard and wear resistant plates 38' applied on the side surfaces of the flattened end portion 38 of shaft 1 allows for an additional trimming or grinding of the respective surfaces if necessity occurs after a certain period of service. It may be well appreciated that such additional fitting and casual repairs may be done in a particularly easy way on small separate parts, so as could not be the case if the entire actuating shaft had to be replaced.

In connection with the embodiment represented on Fig. 5 it should be borne in mind that such structure is a very profitable one, since its entire length is substantially diminished in comparison to such units where an electric motor with standard bearing shield is connected to a complete pump unit, for instance such as represented on Figs. 1 and 2, by any kind of usual coupling device. Moreover the structure of Fig. 5 has the great advantage that all shocks and vibrations which are liable to affect the actuating shaft are consumed by the mass of the motor armature. Thereby of course a perfect consumption and damping of all vibrations and shocks is secured.

What I claim and desire to protect by Letters Patent is:

1. An hydraulic unit adapted for use as power transmission, a pump or motor comprising a stationary supporting body member, actuating means rotatably mounted in said body member, a bearing member rigidly connected to said body member, a casing member rigidly mounted on and revolving with said actuating means, a number of cylinder bores provides in said casing member, a guide member tiltably mounted in said bearing member, a thrust plate member rotatably mounted in and adapted to be tilted bodily with said tiltable guide member, said tiltable thrust plate member being operatively connected to said actuating means so as to be rotated thereby, such operative connection consisting of a member movably mounted in a slot of said thrust plate and adapted movably to embrace a flattened end portion of said actuating means, a number of pitman members universally connected each both with a socket member mounted in said thrust plate member and with a socket member mounted each in a piston adapted to reciprocate in a cylinder bore of said rotating casing member, a distribution slide face provided on a projecting portion of said stationary supporting body member and having both an inlet port and an outlet port communicating with a suction passage and respectively with a pressure passage provided in said stationary supporting body member and adapted to register in turn with slots provided in said revolving cylinder casing member so as to secure in turn a communication of the working spaces of each one of said cylinder bores with a suction passage and with a pressure passage or to have said working spaces cut off from said passages.

2. An hydraulic unit adapted for use as a pump or motor comprising a stationary supporting body member, a bearing member rigidly but removably connected to said supporting body member, an actuating shaft rotatably mounted in said supporting body member, a casing member mounted to rotate with said shaft and provided with a number of cylinder bores, a distribution slide face provided on a projecting portion of said stationary supporting body member, spring means for pressing said revolving cylinder casing against said distribution slide face, so as to secure an efficient seal therebetween, said supporting body member being provided with a suction passage and with a pressure passage communicating respectively with an inlet port and with an outlet port provided in said distribution slide face, each of said cylinder bores having in that end of the cylinder casing which co-operates with said distribution slide face a connecting slot adapted to register in turn with said inlet port and with said outlet port, said device further comprising a guide member tiltably mounted in said bearing member, a thrust plate rotatably mounted in and adapted to be tilted bodily with said tiltable guide member, said thrust plate being operatively connected to a flattened end portion of said actuating shaft, so as to be rotated thereby, by the intermediary of a block mounted slidably and tiltably about an axis in a slot of said thrust plate and adapted to embrace the said flattened end portion of said shaft, so as to permit its sliding and its tilting movement about another axis, there being provided a number of pitman members universally interconnecting said thrust plate with individual pistons adapted to reciprocate in said cylinder bores, so as to enable the working liquid operatively to flow in the desired path.

3. A device as defined in claim 1, the provision, on said actuating shaft, of a flattened end portion having plates of a hard and wear resisting material applied on its flat surfaces, whilst the front and side surfaces of said end portion are spherically rounded off, the diameter of said spherical surface being somewhat inferior to the height of a corresponding aperture formed in a sliding block comprising said flattened end portion of the shaft and being both slidably and tiltably mounted in said thrust plate, the centre of said spherical surface lying in the point of intersection of the tilting axis of said thrust plate with the axis of rotation of said actuating shaft.

4. A device as defined in claim 1, the provision of a pin fixedly mounted in an axial direction of said tiltable guide member rotatably supporting said thrust plate member, a spring pressed ball being slidably mounted in said pin and being adapted yieldingly to urge said sliding block towards the front outer face of said flattened end portion of the said actuating shaft.

FRITZ WEGERDT.